(12) United States Patent
Saini et al.

(10) Patent No.: US 7,216,705 B2
(45) Date of Patent: May 15, 2007

(54) METHODS OF PLACING TREATMENT CHEMICALS

(75) Inventors: Rajesh K. Saini, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 122 days.

(21) Appl. No.: 11/062,943

(22) Filed: Feb. 22, 2005

(65) Prior Publication Data

US 2006/0185847 A1    Aug. 24, 2006

(51) Int. Cl.
*E21B 43/27* (2006.01)
*E21B 43/267* (2006.01)
*E21B 43/02* (2006.01)

(52) U.S. Cl. .................. 166/279; 166/280.1; 166/300; 166/310; 166/276

(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Palmer | |
| 3,173,484 A | 3/1965 | Huitt et al. | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins et al. | |
| 3,366,178 A | 1/1968 | Malone et al. | |
| 3,455,390 A | 7/1969 | Gallus | |
| 3,784,585 A | 1/1974 | Schmitt et al. | |
| 3,819,525 A | 6/1974 | Hattenbrun | |
| 3,828,854 A | 8/1974 | Templeton et al. | |
| 3,868,998 A | 3/1975 | Lybarger et al. | |
| 3,912,692 A | 10/1975 | Casey et al. | |
| 3,948,672 A | 4/1976 | Harnsberger | |
| 3,955,993 A | 5/1976 | Curtice | |
| 3,960,736 A | 6/1976 | Free et al. | |
| 3,968,840 A | 7/1976 | Tate | |
| 3,998,272 A | 12/1976 | Maly | |
| 3,998,744 A | 12/1976 | Arnold et al. | |
| 4,068,718 A | 1/1978 | Cooke, Jr. et al. | |
| 4,169,798 A | 10/1979 | DeMartino | |
| 4,172,066 A | 10/1979 | Zweigle et al. | |
| 4,261,421 A | 4/1981 | Watanabe | |
| 4,387,769 A | 6/1983 | Erbstoesser et al. | |
| 4,460,052 A | 7/1984 | Gockel | |
| 4,470,915 A | 9/1984 | Conway | |
| 4,498,995 A | 2/1985 | Gockel | |
| 4,526,695 A | 7/1985 | Erbstoesser et al. | |
| 4,694,905 A | 9/1987 | Armbruster | |
| 4,715,967 A | 12/1987 | Bellis | |
| 4,716,964 A | 1/1988 | Erbstoesser et al. | |
| 4,785,884 A | 11/1988 | Armbruster | |
| 4,797,262 A | 1/1989 | Dewitz | |
| 4,800,960 A | 1/1989 | Friedman et al. | ........... 166/276 |
| 4,809,783 A | 3/1989 | Hollenbeck et al. | |
| 4,817,721 A | 4/1989 | Pober | |
| 4,843,118 A | 6/1989 | Lai et al. | |
| 4,848,467 A | 7/1989 | Cantu et al. | |
| 4,886,354 A | 12/1989 | Welch et al. | |
| 4,957,165 A | 9/1990 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |
| 4,986,355 A | 1/1991 | Casad et al. | |
| 5,082,056 A | 1/1992 | Tackett, Jr. | |
| 5,142,023 A | 8/1992 | Gruber et al. | |

(Continued)

FOREIGN PATENT DOCUMENTS

EP    0 510 762 A2    10/1992

(Continued)

OTHER PUBLICATIONS

Simmons, et al., *Poly(phenyllactide): Synthesis, Characterization, and Hydrolytic Degradation*, Biomacromolecules, vol. 2, No. 2, (pp. 658-663), Nov. 21, 2000.

(Continued)

*Primary Examiner*—Brian E. Glessner
*Assistant Examiner*—Angela DiTrani
(74) *Attorney, Agent, or Firm*—Robert A. Kent; Baker Botts

(57) ABSTRACT

Among the methods provided are methods of treating a subterranean formation comprising placing a solid treatment chemical and a tacky polymer onto a solid substrate to create a coated solid substrate; placing the coated solid substrate into a portion of a subterranean formation; and, allowing the tacky polymer to degrade and allowing the solid treatment chemical to be released into the portion of the subterranean formation. Also provided are methods of creating a particulate pack comprising a treatment chemical in a subterranean formation comprising placing a solid treatment chemical and a tacky polymer onto a particulate to create a coated particulate; creating a slurry comprising the coated particulates slurried into a treatment fluid; placing the slurry into a portion of a subterranean formation so as to create a particulate pack; and, allowing the tacky polymer to degrade and allowing the solid treatment chemical to be released into the portion of the subterranean formation.

20 Claims, No Drawings

U.S. PATENT DOCUMENTS

| | | | |
|---|---|---|---|
| 5,216,050 A | 6/1993 | Sinclair | |
| 5,247,059 A | 9/1993 | Gruber et al. | |
| 5,249,628 A | 10/1993 | Surjaatmadja | |
| 5,295,542 A | 3/1994 | Cole et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawson et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,497,830 A | 3/1996 | Boles et al. | |
| 5,499,678 A | 3/1996 | Surjaatmadja et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,591,700 A | 1/1997 | Harris et al. | |
| 5,594,095 A | 1/1997 | Gruber et al. | |
| 5,604,186 A | 2/1997 | Hunt et al. | |
| 5,607,905 A | 3/1997 | Dobson, Jr. et al. | |
| 5,663,123 A | 9/1997 | Goodhue et al. | 507/225 |
| 5,670,473 A | 9/1997 | Scepanski | |
| 5,698,322 A | 12/1997 | Tsai et al. | |
| 5,765,642 A | 6/1998 | Surjaatmadja | |
| 5,791,415 A | 8/1998 | Nguyen et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,893,416 A | 4/1999 | Read | |
| 5,908,073 A | 6/1999 | Nguyen et al. | |
| 5,924,488 A | 7/1999 | Nguyen et al. | |
| 5,964,291 A | 10/1999 | Bourne et al. | |
| 6,004,400 A | 12/1999 | Bishop et al. | |
| 6,024,170 A | 2/2000 | McCabe et al. | |
| 6,028,113 A | 2/2000 | Scepanski | |
| 6,047,772 A | 4/2000 | Weaver et al. | |
| 6,114,410 A | 9/2000 | Betzold | |
| 6,123,965 A | 9/2000 | Jacob et al. | |
| 6,131,661 A | 10/2000 | Conner et al. | |
| 6,135,987 A | 10/2000 | Tsai et al. | |
| 6,143,698 A | 11/2000 | Murphey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 * | 4/2001 | Nguyen et al. | 166/276 |
| 6,209,646 B1 | 4/2001 | Reddy et al. | |
| 6,214,773 B1 | 4/2001 | Harris et al. | |
| 6,242,390 B1 | 6/2001 | Mitchell et al. | |
| 6,260,622 B1 | 7/2001 | Blok et al. | |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 | 5/2002 | Nguyen et al. | |
| 6,394,185 B1 * | 5/2002 | Constien | 166/296 |
| 6,422,314 B1 | 7/2002 | Todd et al. | |
| 6,454,003 B1 | 9/2002 | Chang et al. | |
| 6,485,947 B1 | 11/2002 | Rajgarhia et al. | |
| 6,488,091 B1 | 12/2002 | Weaver et al. | |
| 6,488,763 B2 | 12/2002 | Brothers et al. | |
| 6,494,263 B2 | 12/2002 | Todd | |
| 6,508,305 B1 | 1/2003 | Brannon et al. | |
| 6,527,051 B1 | 3/2003 | Reddy et al. | |
| 6,554,071 B1 | 4/2003 | Reddy et al. | |
| 6,569,814 B1 | 5/2003 | Brady et al. | |
| 6,599,863 B1 | 7/2003 | Palmer et al. | |
| 6,667,279 B1 | 12/2003 | Hessert et al. | |
| 6,669,771 B2 | 12/2003 | Tokiwa et al. | |
| 6,681,856 B1 | 1/2004 | Chatterji et al. | |
| 6,686,328 B1 | 2/2004 | Binder | |
| 6,702,023 B1 | 3/2004 | Harris et al. | |
| 6,710,019 B1 | 3/2004 | Sawdon et al. | |
| 6,761,218 B2 | 7/2004 | Nguyen et al. | |
| 6,763,888 B2 | 7/2004 | Harris et al. | |
| 6,817,414 B2 | 11/2004 | Lee | |
| 6,896,058 B2 | 5/2005 | Munoz, Jr. et al. | |
| 6,949,491 B2 | 9/2005 | Cooke, Jr. | |
| 7,066,258 B2 * | 6/2006 | Justus et al. | 166/276 |
| 2001/0016562 A1 | 8/2001 | Muir et al. | |
| 2002/0036088 A1 | 3/2002 | Todd | |
| 2002/0125012 A1 | 9/2002 | Dawson et al. | |
| 2003/0060374 A1 | 3/2003 | Cooke, Jr. | |
| 2003/0114314 A1 | 6/2003 | Ballard et al. | |
| 2003/0130133 A1 | 7/2003 | Vollmer | |
| 2003/0188766 A1 | 10/2003 | Banerjee et al. | |
| 2003/0234103 A1 | 12/2003 | Lee et al. | |
| 2004/0014607 A1 | 1/2004 | Sinclair et al. | |
| 2004/0040706 A1 | 3/2004 | Hossaini et al. | |
| 2004/0055747 A1 | 3/2004 | Lee | |
| 2004/0094300 A1 | 5/2004 | Sullivan et al. | |
| 2004/0106525 A1 | 6/2004 | Willberg et al. | |
| 2004/0138068 A1 | 7/2004 | Rimmer et al. | |
| 2004/0152601 A1 | 8/2004 | Still et al. | |
| 2004/0152602 A1 | 8/2004 | Boles | |
| 2004/0216876 A1 | 11/2004 | Lee | |
| 2004/0231845 A1 | 11/2004 | Cooke, Jr. | |
| 2004/0261993 A1 | 12/2004 | Nguyen | |
| 2004/0261995 A1 | 12/2004 | Nguyen et al. | |
| 2004/0261996 A1 | 12/2004 | Munoz, Jr. et al. | |
| 2004/0261999 A1 | 12/2004 | Nguyen | |
| 2005/0006095 A1 | 1/2005 | Justus et al. | |
| 2005/0028976 A1 * | 2/2005 | Nguyen | 166/276 |
| 2005/0034861 A1 | 2/2005 | Saini et al. | |
| 2005/0034865 A1 | 2/2005 | Todd et al. | |
| 2005/0034868 A1 | 2/2005 | Frost et al. | |
| 2005/0103496 A1 | 5/2005 | Todd et al. | |
| 2005/0252659 A1 | 11/2005 | Sullivan et al. | |
| 2005/0272613 A1 | 12/2005 | Cooke, Jr. | |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |

WO  WO 2004/038176 A1  5/2004

OTHER PUBLICATIONS

Yin, et al., *Preparation and Characterization of Substituted Polylactides*, American Chemical Society, vol. 32, No. 23, (pp. 7711-7718), Oct. 19, 1999.
Yin, et al., *Synthesis and Properties of Polymers Derived form Substituted Lactic Acids*, American Chemical Society, Ch. 12, 2001 (pp. 147-159), no date.
Cantu, et al, *Laboratory and Field Evaluation of a Combined Fluid-Loss-Control Additive and Gel Breaker for Fracturing Fluids*, SPE 18211, Society of Petroleum Engineers, 1990, no date.
Love, et al, *Selectively Placing Many Fractures in Openhole Horizontal Wells Improves Production*, SPE 50422, Society of Petroleum Engineers, Nov. 1, 1998.
McDaniel, et al, *Evolving New Stimulation Process Proves Highly Effective in Level 1 Dual-Lateral Completion*, SPE 78697, Society of Petroleum Engineers, Oct. 23, 2002.
Albertsson, et al, *Aliphatic Polyesters: Systhesis, Properties and Applications*, Advances in Polymer Science, vol. 157, Degradable Aliphatic Polyesters, 2002, no date.
Dechy-Cabaret, et al, *Controlled Ring-Opening Polymerization of Lactide and Glycolide*, American Chemical Society, Chemical Reviews, A-Z, AA-AD, received Apr. 26, 2004.
Funkhouser, et al, *Synthetic Polymer Fracturing Fluid for High-Temperature Applications*, SPE 80236, Society of Petroleum Engineers, Feb. 5, 2003.
*Chelating Agents*, Encyclopedia of Chemical Technology, vol. 5 (764-795), no date.
Vichaibun, et al, *A New Assay for the Enzymatic Degradation of Polylactic Acid, Short Report*, ScienceAsia, vol. 29, Jan. 30, 2003 (pp. 297-300).
Halliburton, *SurgiFrac$^{SM}$ Service, A Quick and Cost-Effective Method to help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications, no date.
Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.
M. Ahmad, et al.: Ortho Ester Hydrolysis: Direct Evidence for a Three-Stage Reaction Mechanism, Engineering Information Inc., NY, NY vol. 101, No. 10 (XP-002322843), May 9, 1979.

Skrabal et al., *The Hydrolysis Rate of Orthoformic Acid Ethyl Ether*, Chemical Institute of the University of Graz, pp. 1-38, Jan. 13, 1921.
Heller, et al., *Poly(ortho esters)—From Concept To Reality*, Biomacromolecules, vol. 5, No. 5, May 19, 2004 (pp. 1625-1632).
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, Jan. 5, 1999 (pp. 301-307).
Ng, et al., *Synthesis and Erosion Studies of Self-Catalyzed Poly(ortho ester)s*, American Chemical Society, vol. 30, No. 4, (pp. 770-772), Jul. 18, 1996.
Ng, et al., *Development Of A Poly(ortho ester) prototype With A Latent Acid In The Polymer Backbone For 5-fluorouracil Delivery*, Journal of Controlled Release 65, (pp. 367-374), Jul. 29, 1999.
Rothen-Weinhold, et al., Release of BSA from poly(ortho ester) extruded thin strands, *Journal of Controlled Release 71*, (pp. 31-37), Jun. 28, 2000.
Heller, et al., *Poly(ortho ester)s—their development and some recent applications*, European Journal of Pharmaceutics and Biopharmaceutics, 50, Jan. 24, 2000, (pp. 121-128).
Heller, et al., *Poly(ortho esters); synthesis, characterization, properties and uses*, Advanced Drug Delivery Reviews, 54, Mar. 22, 2002, (pp. 1015-1039).
Heller, et al., *Poly (ortho esters) For The Pulsed And Continuous Delivery of Peptides And Proteins*, Controlled Release and Biomedical Polymers Department, SRI International, (pp. 39-46), no date.
Zignani, et al., *Subconjunctival biocompatibility of a viscous bioerodable poly(ortho ester)*, J. Biomed Mater Res, 39, pp. 277-285, Dec. 5, 1996.
Toncheva, et al., *Use of Block Copolymers of Poly(Ortho Esters) and Poly (Ethylene Glycol)*, Journal of Drug Targeting, Jun. 13, 2003, vol. 11(6), pp. 345-353.
Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, pp. 145-161, Aug. 16, 2000.
Heller, et al., *Release of Norethindrone from Poly(Ortho Esters)*, Polymer Engineering and Science, Mid-Aug. 1981, vol. 21, No. 11 (pp. 727-731).
Cordes, et al., *Mechanism and Catalysis for Hydrolysis of Acetals, Ketals, and Other Esters*, Department of Chemistry, Indiana University, Bloomington, Indiana, Chemical Reviews, vol. 74, No. 5, pp. 581-603, Jun. 19, 1973.
Todd, et al., *A Chemical "Trigger" Useful for Oilfield Applications*, Society of Petroleum Engineers, Inc., SPE 92709, Feb. 4, 2005.

* cited by examiner

METHODS OF PLACING TREATMENT CHEMICALS

BACKGROUND

The present invention relates to methods for placing treatment chemicals into a portion of a subterranean formation. More particularly the present invention relates to methods of using tacky polymers to transport treatment chemicals to a portion of a subterranean formation.

Subterranean operations often use particulates coated with tackifying agents or resins. One example of a production stimulation operation using coated particulates is hydraulic fracturing, wherein a formation is treated to increase its permeability by hydraulically fracturing the formation to create or enhance one or more cracks or "fractures." In most cases, a hydraulic fracturing treatment involves pumping a proppant-free, viscous fluid (known as a pad fluid) into a subterranean formation faster than the fluid can escape into the formation so that the pressure in the formation rises and the formation breaks, creating an artificial fracture or enlarging a natural fracture. Then a proppant is generally added to the fluid to form a slurry that is pumped into the fracture to prevent the fracture from closing when the pumping pressure is released. A portion of the proppant may be coated with a tackifying agent, among other things, to control fines from migrating into the proppant pack. A portion of the proppant may also be coated with curable resin so that, once cured, the placed proppant forms a consolidated mass and prevents the proppant from flowing back during production of the well.

An example of a well completion operation using a treating fluid containing coated particulates is gravel packing. Gravel packing treatments are used, among other things, to reduce the migration of unconsolidated formation particulates into the well bore. In gravel packing operations, particles known in the art as gravel are carried to a well bore by a treatment fluid. That is, the particulates are suspended in a treatment fluid, which may be viscosified, and the treatment fluid is pumped into a well bore in which the gravel pack is to be placed. The treatment fluid leaks off into the subterranean zone and/or is returned to the surface while the particulates are left in the zone. The resultant gravel pack acts as a filter to separate formation sands from produced fluids while permitting the produced fluids to flow into the well bore. A portion of the gravel may be coated with resin or tackifying agent, among other things, to further help control the migration of formation fines. Typically, gravel pack operations involve placing a gravel pack screen in the well bore and packing the surrounding annulus between the screen and the well bore with gravel designed to prevent the passage of formation sands through the pack. The gravel pack screen is generally a type of filter assembly used to support and retain the gravel placed during the gravel pack operation. A wide range of sizes and screen configurations are available to suit the characteristics of a particular well bore, the production fluid, and the subterranean formation sands. When installing the gravel pack, the gravel is carried to the formation in the form of a slurry by mixing the gravel with a viscosified carrier fluid. Once the gravel is placed in the well bore, the viscosity of the carrier fluid is reduced, and it is returned to the surface. Such gravel packs may be used to stabilize the formation while causing minimal impairment to well productivity. The gravel, among other things, acts to prevent formation sands from occluding the screen or migrating with the produced fluids, and the screen, among other things, acts to prevent the gravel from entering the well bore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

In subterranean operations, a variety of treatment chemicals may be used to facilitate the production of fluids such as water and hydrocarbons. These include gel breakers, dispersing agents, and defoamers, among others. One of the challenges faced when using such treatment chemicals is placing them where they will be most effective to avoid over-use, waste, and/or potentially deleterious effects brought about by an incorrect placement. By way of example, a solid treatment chemical may be used in combination with a fracturing operation wherein proppant particulates are being placed into the formation. In that instance, if the solid treatment chemical is an agent meant to help remove a filter cake, it will be desirable for the treatment chemical to be placed not only abutting the filter cake but also as uniformly as possible. However, in such solid treatment chemicals are often of a differing size, shape, or density to the proppant particulates being placed and so they have a tendency, while suspended in the fracturing fluid, to segregate away from the proppant particulates. Such segregation often leads to non-uniform placement that, in this example, could cause incomplete removal of the filter cake. Thus, it is desirable to be able to place treatment chemicals more reliably within a portion of a subterranean formation.

In addition to coating particulates with a resin or tackifier, in some subterranean operations it may be desirable to coat other solid substrates (such as gravel packing screens and well bore tools). For example, in some gravel packing operations it may be beneficial to place a treatment chemical directly onto the screen. Moreover, many subterranean operations use various tools that may themselves benefit from being coated with a treatment chemical. Unfortunately, many treatment chemicals, particularly solid treatment chemicals are not able to be easily placed onto such solid substrates. While tacky substances such as aqueous tackifiers, non-aqueous tackifiers, and resins have been used to attach solid treatment chemicals to solid substrates such as proppant particulates, many operations and substrates would suffer negative effects from being in contact with such a relatively permanently tacky substance. Thus, it would be of great benefit to be able to place treatment chemicals onto solid substrates with a tacky substance that would substantially degrade once down hole.

SUMMARY OF THE INVENTION

The present invention relates to methods for placing treatment chemicals into a portion of a subterranean formation. More particularly the present invention relates to methods of using tacky polymers to transport treatment chemicals to a portion of a subterranean formation.

One embodiment of the present invention provides methods of treating a portion of a subterranean formation comprising placing a solid treatment chemical and a tacky polymer onto a solid substrate to create a coated solid substrate; placing the coated solid substrate into a portion of a subterranean formation; and, allowing the tacky polymer to degrade and allowing the solid treatment chemical to be released into the portion of the subterranean formation.

Another embodiment of the present invention provides methods of creating a particulate pack comprising a treatment chemical in a portion of a subterranean formation comprising placing a solid treatment chemical and a tacky polymer onto a particulate to create a coated particulate; creating a slurry comprising the coated particulates slurried into a treatment fluid; placing the slurry into a portion of a subterranean formation so as to create a particulate pack; and, allowing the tacky polymer to degrade and allowing the solid treatment chemical to be released into the portion of the subterranean formation.

The features and advantages of the present invention will be readily apparent to those skilled in the art upon a reading of the description of preferred embodiments that follows.

DESCRIPTION OF PREFERRED EMBODIMENTS

The present invention relates to methods for placing treatment chemicals into a portion of a subterranean formation. More particularly the present invention relates to methods of using tacky polymers to transport treatment chemicals to a portion of a subterranean formation.

Some embodiments of the present invention describe methods of applying a tacky polymer to the surface of a solid substrate to be used in a subterranean operation (such as a proppant particulate, gravel particulate, tool, screen, etc.) and then applying a solid treatment chemical to the tacky surface of the solid substrate having the tacky polymer thereon. Other embodiments of the present invention comprise mixing a solid treatment chemical with a tacky polymer and then placing the tacky mixture of the polymer comprising the treatment chemical onto a solid substrate. Still other embodiments comprise mixing a liquid treatment chemical with a tacky polymer and then placing the tacky mixture of the polymer comprising the treatment chemical onto a solid substrate.

Any chemical that is useful down hole and that is in substantially solid form at room temperature and that does not adversely react with the tacky polymer may be used as a solid treatment chemical in the present invention. Suitable treatment chemicals include but are not limited to chelating agents, gel breakers, dispersants, defoamers, delinkers, scale inhibitors, crosslinkers, surfactants, paraffin and wax inhibitors, anti-sludging agents, corrosion inhibitors, de-emulsifiers, foaming agents, tracers, and combinations thereof.

Tacky polymers suitable for use in the methods of the present invention comprise any polymers that are tacky and that will degrade over time in a subterranean environment. As used herein, the term "tacky," in all of its forms, generally refers to a substance having a nature such that it is somewhat sticky to the touch and capable of being applied to a solid substrate. In the methods of the present invention the tacky polymer must be tacky at least when the solid treatment chemical is being attached to the tacky polymer. Thus, the polymer must generally be tacky at temperatures ranging from about 25° F. to about 100° F. Moreover, suitable tacky polymers are degradable, that is they are capable of undergoing an irreversible degradation down hole. The term "irreversible" as used herein means that the tacky polymer, once degraded down hole, should not recrystallize or reconsolidate while down hole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. The degradation can be a result of, among other things, a chemical or thermal reaction or a reaction induced by radiation. The degradability of a tacky polymer depends at least in part on its backbone structure. For instance, the presence of hydrolysable and/or oxidizable linkages in the backbone often yields a material that will degrade as described herein. The rates at which such tacky polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the tacky polymer is subjected may affect how it degrades, e.g., temperature, presence of moisture, oxygen, microorganisms, enzymes, pH, and the like.

Suitable examples of tacky, degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(ortho esters); poly(amino acids); poly(ethylene oxide); and polyphosphazenes. One skilled in the art will recognize that plasticizers may be included in forming suitable polymeric degradable materials of the present invention. The plasticizers may be present in an amount sufficient to provide the desired characteristics, for example, more effective compatibilization of the melt blend components, improved processing characteristics during the blending and processing steps, and control and regulation of the sensitivity and degradation of the polymer by moisture.

In instances wherein the chosen tacky polymer is not naturally tacky or is not naturally tacky enough, it may be made so by mixing with a solvent. Suitable solvents include, but are not limited to, acetone, propylene carbonate, di(propylene glycol)methyl ether, di(propylene glycol)propyl ether, di(propylene glycol)butyl ether, di(propylene glycol) methyl ether acetate, isopropyl alcohol, chloroform, dichloromethane, trichloromethane, 1,2-dichlorobenzene, tetrahydrofuran, benzene, acetonitrile, dioxane, dimethylformamide, toluene, ethyl acetate, isoamyl alcohol, N-methylpyrrolidone, xylenes, dichloroacetic acid, m-cresol, hexafluoroisopropanol, diphenyl ether, acetonitrile, methanol, ethyl benzene, naphthalene, naphtha and combinations thereof. Another type of suitable solvent is a plasticizer, examples of plasticizers useful for this purpose include, but are not limited to, polyethylene glycol; polyethylene oxide; oligomeric lactic acid; citrate esters (such as tributyl citrate oligomers, triethyl citrate, acetyltributyl citrate, acetyltriethyl citrate); glucose monoesters; partially fatty acid esters; PEG monolaurate; triacetin; poly(ε-caprolactone); poly(hydroxybutyrate); glycerin-1-benzoate-2,3-dilaurate; glycerin-2-benzoate-1,3-dilaurate; starch; bis(butyl diethylene glycol)adipate; ethylphthalyethyl glycolate; glycerine diacetate monocaprylate; diacetyl monoacyl glycerol; polypropylene glycol (and epoxy derivatives thereof);

poly(propylene glycol)dibenzoate, dipropylene glycol dibenzoate; glycerol; ethyl phthalyl ethyl glycolate; poly(ethylene adipate)disterate; di-iso-butyl adipate; and combinations thereof.

While any polymer that is degradable and is either tacky or may be made tacky by mixing with a plasticizer or solvent may be used in the methods of the present invention, some examples of particularly suitable polymers include one or more of the following: a poly(ester), a poly(orthoester), an olegomeric poly(lactide), or an olegomeric poly(lactide-co-glycolide). In some embodiments of the present invention suitable tacky polymers may comprise poly(esters) and/or poly(orthoesters). One skilled in the art will generally be able to select a polymer at a molecular weight suitable to provide the necessary tacky character; for example, poly(lactic acid) is generally tacky at room temperatures at molecular weights up to about 10,000. Other embodiments of the methods of the present invention may use higher molecular weight poly(esters) and/or poly(orthoesters) that are naturally solid at around room temperature and mix those higher molecular weight poly(esters) and/or poly(orthoesters) with a solvent capable of making the higher molecular weight poly(esters) and/or poly(orthoesters) sufficiently tacky.

According to some methods of the present invention, the treatment chemical and the tacky polymer may be applied to any solid substrate that may be sent down hole to a portion of a subterranean formation where a treatment chemical may be needed. Examples of suitable solid substrates include, but are not limited to, particulates (such as proppant or gravel), tools (such as packers, drill bit assemblies, tubing, casing, logging tools, plugs, etc.), and screens such as those used in frac-packing and gravel packing operations.

Particulates suitable for use in the present invention may be comprised of any material suitable for use in subterranean operations. Suitable particulate materials include, but are not limited to, sand; bauxite; ceramic materials; glass materials; polymer materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable; suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Typically, the particulates have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture and that are often included in proppant and gravel treatments may be considered particulates under the methods of the present invention.

In embodiments of the present invention wherein the solid substrate is a particulate, the particulate coated with a solution of tacky polymer comprising a solid treatment chemical may be suspended in any treatment fluid known in the art, including aqueous gels, viscoelastic surfactant gels, oil gels, foamed gels, a heavy brine, and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the treatment fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, treatment fluid, among other things, reduces fluid loss and allows the treatment fluid to transport significant quantities of suspended particulates. The water used to form the treatment fluid may be fresh water, salt water, brine, or any other aqueous liquid that does not adversely react with the other components.

A variety of gelling agents may be used, including hydratable polymers that contain one or more functional groups such as hydroxyl, carboxyl, sulfate, sulfonate, amino, or amide groups. Suitable gelling typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan, Okla. Suitable crosslinkers generally are present in the viscosified treatment fluids of the present invention in an amount sufficient to provide, among other things, the desired degree of crosslinking between gelling agent molecules. In certain exemplary embodiments of the present invention, the crosslinkers may be present in an amount in the range from about 0.001% to about 10% by weight of the water in the treatment fluid. In certain exemplary embodiments of the present invention, the crosslinkers may be present in the viscosified treatment fluids of the present invention in an amount in the range from about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

The gelled or gelled and cross-linked treatment fluids may also include internal delayed gel breakers such as enzyme, oxidizing, acid buffer, or temperature-activated gel breakers. The gel breakers cause the viscous carrier fluids to revert to thin fluids that can be produced back to the surface after they have been used to place proppant particles in subterranean fractures. The gel breaker used is typically present in the treatment fluid in an amount in the range of from about 0.5% to about 10% by weight of the gelling agent. The treatment fluids may also include one or more of a variety of well-known additives, such as gel stabilizers, fluid loss control additives, clay stabilizers, bactericides, and the like.

To facilitate a better understanding of the present invention, the following example of specific embodiments is given. In no way should the following example be read to limit or define the entire scope of the invention.

THEORETICAL EXAMPLE

An 8½" open hole section of a well bore exists that has an undesirable drill-in fluid filter cake consisting of xanthan, starch, and calcium carbonate on the face of the well bore. The portion of the well bore at issue is approximately 180° F. and filled with 10% sodium chloride brine. A 5½ OD wire wrapped screen is provided to be placed into the portion of the well bore at issue. The wrapped screen is coated with a mixture of a treatment chemical (magnesium peroxide) and a tacky polymer (poly(lactide) having a molecular weight in the range of from about 1000 to about 5000 such that there is an approximately) so that a ⅟16 inch coating of the mixture is on the screen wires. The amount of magnesium peroxide added to the coating mixture is selected such that there are about 2 pounds of magnesium peroxide for every 1000 square feet of filter cake area in the 8½" open hole section.

Once placed in the well bore, the poly(lactide) will begin to degrade in the presence of the water in the brine to generate lactic acid generated by the degradation of the poly(lactide). That lactic acid may then react with the magnesium peroxide to generate hydrogen peroxide. The combination of the lactic acid and hydrogen peroxide may then work to break down the drill-in fluid filter cake.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a portion of a subterranean formation comprising:
   placing a tacky polymer onto a solid substrate and then placing a solid treatment chemical onto the solid substrate to create a coated solid substrate;
   placing the coated solid substrate into a portion of a subterranean formation; and,
   allowing the tacky polymer to degrade and allowing the solid treatment chemical to be released into the portion of the subterranean formation.

2. The method of claim 1 wherein the solid treatment chemical is selected from the group consisting of: a chelating agent, a gel breaker, a dispersant, a defoamer, a delinker, a scale inhibitor, a crosslinker, a surfactant, a paraffin inhibitor, a wax inhibitor, an anti-sludging agent, a corrosion inhibitor, a de-emulsifier, a foaming agent, a tracer, and combinations thereof.

3. The method of claim 1 wherein the tacky polymer is selected from the group consisting of: a polysaccharide; a chitin; a chitosan; a protein; an aliphatic polyester; a poly(lactide); a poly(glycolide); a poly(ϵ-caprolactone); a poly(hydroxybutyrate); a poly(anhydride); an aliphatic polycarbonate; a poly(ortho ester); a poly(amino acid); a poly(ethylene oxide); and a polyphosphazene.

4. The method of claim 1 wherein the tacky polymer is mixed with a solvent selected from the group consisting of: acetone, propylene carbonate, di(propylene glycol) methyl ether, di(propylene glycol) propyl ether, di(propylene glycol) butyl ether, di(propylene glycol) methyl ether acetate, isopropyl alcohol, chloroform, dichloromethane, trichloromethane, 1,2-dichlorobenzene, tetrahydrofuran, benzene, acetonitrile, dioxane, dimethylformamide, toluene, ethyl acetate, isoamyl alcohol, N-methylpyrrolidone, xylenes, dichloroacetic acid, m-cresol, hexafluoroisopropanol, diphenyl ether, methanol, ethyl benzene, naphthalene, naphtha and combinations thereof.

5. The method of claim 1 wherein the tacky polymer is mixed with a plasticizer selected from the group consisting of: polyethylene glycol, polyethylene oxide, oligomeric lactic acid, citrate ester, glucose monoester, partially fatty acid ester, PEG monolaurate, triacetin, poly(e-caprolactone), poly(hydroxybutyrate), glycerin-1-benzoate-2,3-dilaurate, glycerin-2-benzoate-1,3-dilaurate, starch, bis(butyl diethylene glycol)adipate, ethylphthalylethyl glycolate, glycerine diacetate monocaprylate, diacetyl monoacyl glycerol, polypropylene glycol, epoxy derivatives of polypropylene glycol, poly(propylene glycol)dibenzoate, dipropylene glycol dibenzoate, glycerol, ethyl phthalyl ethyl glycolate, poly(ethylene adipate)disterate, di-iso-butyl adipate and combinations thereof.

6. The method of claim 1 wherein the solid substrate is selected from the group consisting of: proppant particulates, gravel particulates, a down hole tool, and a screen.

7. The method of claim 1 further comprising:
   creating a slurry comprising the coated solid substrates and a treatment fluid; and placing the slurry into a portion of the subterranean formation so as to create a particulate pack.

8. The method of claim 7 wherein the treatment fluid is selected from the group consisting of: an aqueous gel, a viscoelastic surfactant gel, an oil gel, a foamed gel, a heavy brine, and an emulsion.

9. A method of treating a portion of a subterranean formation comprising:
mixing a tacky polymer with a solid treatment chemical and placing the mixture onto a solid substrate to create a coated solid substrate;
placing the coated solid substrate into a portion of a subterranean formation;
allowing the tacky polymer to degrade; and
allowing the solid treatment chemical to be released into the portion of the subterranean formation.

10. The method of claim 9 wherein the solid treatment chemical is selected from the group consisting of: a chelating agent, a gel breaker, a dispersant, a defoamer, a delinker, a scale inhibitor, a crosslinker, a surfactant, a paraffin inhibitor, a wax inhibitor, an anti-sludging agent, a corrosion inhibitor, a de-emulsifier, a foaming agent, a tracer, and combinations thereof.

11. The method of claim 9 wherein the tacky polymer is selected from the group consisting of: a polysaccharide; a chitin; a chitosan; a protein; an aliphatic polyester; a poly(lactide); a poly(glycolide); a poly($\epsilon$-caprolactone); a poly(hydroxybutyrate); a poly(anhydride); an aliphatic polycarbonate; a poly(ortho ester); a poly(amino acid); a poly(ethylene oxide); and a polyphosphazene.

12. The method of claim 9 wherein the tacky polymer is mixed with a solvent selected from the group consisting of: acetone, propylene carbonate, di(propylene glycol) methyl ether, di(propylene glycol) propyl ether, di(propylene glycol) butyl ether, di(propylene glycol) methyl ether acetate, isopropyl alcohol, chloroform, dichloromethane, trichloromethane, 1,2-dichlorobenzene, tetrahydrofuran, benzene, acetonitrile, dioxane, dimethylformamide, toluene, ethyl acetate, isoamyl alcohol, N-methylpyrrolidone, xylenes, dichloroacetic acid, m-cresol, hexafluoroisopropanol, diphenyl ether, methanol, ethyl benzene, naphthalene, naphtha, and combinations thereof.

13. The method of claim 9 wherein the tacky polymer is mixed with a plasticizer selected from the group consisting of: polyethylene glycol, polyethylene oxide, oligomeric lactic acid, citrate ester, glucose monoester, partially fatty acid ester, PEG monolaurate, triacetin, poly(e-caprolactone), poly(hydroxybutyrate), glycerin-1-benzoate-2,3-dilaurate, glycerin-2-benzoate-1,3-dilaurate, starch, bis(butyl diethylene glycol)adipate, ethylphthalylethyl glycolate, glycerine diacetate monocaprylate, diacetyl monoacyl glycerol, polypropylene glycol, epoxy derivatives of polypropylene glycol, poly(propylene glycol)dibenzoate, dipropylene glycol dibenzoate, glycerol, ethyl phthalyl ethyl glycolate, poly(ethylene adipate)disterate, di-iso-butyl adipate, and combinations thereof.

14. The method of claim 9 wherein the solid substrate is selected from the group consisting of: proppant particulates, gravel particulates, a down hole tool, and a screen.

15. A method of creating a particulate pack comprising a treatment chemical in a portion of a subterranean formation comprising:
mixing a tacky polymer with a solid treatment chemical and placing the mixture onto the particulate to create a coated particulate;
creating a slurry comprising the coated particulates and a treatment fluid;
placing the slurry into a portion of a subterranean formation so as to create a particulate pack; and
allowing the tacky polymer to degrade and allowing the solid treatment chemical to be released into the portion of the subterranean formation.

16. The method of claim 15 wherein the solid treatment chemical is selected from the group consisting of: a chelating agent, a gel breaker, a dispersant, a defoamer, a delinker, a scale inhibitor, a crosslinker, a surfactant, a paraffin inhibitor, a wax inhibitor, an anti-sludging agent, a corrosion inhibitor, a de-emulsifier, a foaming agent, a tracer, and combinations thereof.

17. The method of claim 15 wherein the tacky polymer is selected from the group consisting of: a polysaccharide; a chitin; a chitosan; a protein; an aliphatic polyester; a poly(lactide); a poly(glycolide); a poly($\epsilon$-caprolactone); a poly(hydroxybutyrate); a poly(anhydride); an aliphatic polycarbonate; a poly(ortho ester); a poly(amino acid); a poly(ethylene oxide); and a polyphosphazene.

18. The method of claim 15 wherein the tacky polymer is mixed with a solvent selected from the group consisting of: acetone, propylene carbonate, di(propylene glycol) methyl ether, di(propylene glycol) propyl ether, di(propylene glycol) butyl ether, di(propylene glycol) methyl ether acetate, isopropyl alcohol, chloroform, dichloromethane, trichloromethane, 1,2-dichlorobenzene, tetrahydrofuran, benzene, acetonitrile, dioxane, dimethylformamide, toluene, ethyl acetate, isoamyl alcohol, N-methylpyrrolidone, xylenes, dichloroacetic acid, m-cresol, hexafluoroisopropanol, diphenyl ether, methanol, ethyl benzene, naphthalene, naphtha, and combinations thereof.

19. The method of claim 15 wherein the tacky polymer is mixed with a plasticizer selected from the group consisting of: polyethylene glycol, polyethylene oxide, oligomeric lactic acid, citrate ester, glucose monoester, partially fatty acid ester, PEG monolaurate, triacetin, poly(e-caprolactone), poly(hydroxybutyrate), glycerin-1-benzoate-2,3-dilaurate, glycerin-2-benzoate-1,3-dilaurate, starch, bis(butyl diethylene glycol)adipate, ethylphthalylethyl glycolate, glycerine diacetate monocaprylate, diacetyl monoacyl glycerol, polypropylene glycol, epoxy derivatives of polypropylene glycol, poly(propylene glycol)dibenzoate, dipropylene glycol dibenzoate, glycerol, ethyl phthalyl ethyl glycolate, poly(ethylene adipate)disterate, di-iso-butyl adipate, and combinations thereof.

20. The method of claim 15 wherein the treatment fluid is selected from the group consisting of: an aqueous gel, a viscoelastic surfactant gel, an oil gel, a foamed gel, a heavy brine, and an emulsion.

* * * * *